United States Patent
Vioux et al.

(10) Patent No.: US 7,622,422 B2
(45) Date of Patent: Nov. 24, 2009

(54) IONIC CONDUCTING GELS, PREPARATION METHOD THEREOF AND USE OF SAME

(75) Inventors: André Vioux, Montferrier (FR); Jean Le Bideau, Montpellier (FR); Marie-Alexandra Neouze, Chamalieres (FR); Fabrice Leroux, Chamalieres (FR)

(73) Assignees: Centre National de la Recherche Scientifique, Paris (FR); Universite Montpellier II, Montpeillier (FR); Universite Blaise Pascal Clermont II, Clermont Ferrand (FR)

( * ) Notice: Subject to any disclaimer, the term of this patent is extended or adjusted under 35 U.S.C. 154(b) by 376 days.

(21) Appl. No.: 10/562,680

(22) PCT Filed: Jul. 2, 2004

(86) PCT No.: PCT/FR2004/001723

§ 371 (c)(1),
(2), (4) Date: Jun. 13, 2006

(87) PCT Pub. No.: WO2005/007746

PCT Pub. Date: Jan. 27, 2005

(65) Prior Publication Data

US 2007/0007137 A1    Jan. 11, 2007

(30) Foreign Application Priority Data

Jul. 4, 2003    (FR)    ................... 03 08190

(51) Int. Cl.
*B01J 20/10* (2006.01)
*C07D 233/54* (2006.01)
*C07F 7/02* (2006.01)
*H01M 8/10* (2006.01)

(52) U.S. Cl. .................... 502/405; 546/14; 548/110; 548/335.1; 429/33

(58) Field of Classification Search .................. 546/14; 548/110, 335.1; 502/405; 429/33
See application file for complete search history.

(56) References Cited

OTHER PUBLICATIONS

Dai et al. "Preparation of silica aerogel using ionic liquids as solvents" Chemical Communications, 2000, pp. 243-244.*
Wang et al. (Chem. Comm. 2002, 2972-2973).*
Sheng Dai, Y. H. Ju, H. J. Gao, J.S. Lin, S. J. Pennycook, C.E. Barnes: "Preparation of silica aerogel using ionic liquids as solvents", Chem. Commun., vol. 3, 2000, pp. 243-244, XP002274531 cite dans la demande le document en entier.
Helene Olivier-Bouirbigou and Lionel Magna:, "Ionic liquids: perspectives for organic and catalytic reactions", Journal of Molecular Catalysis A: Chemical, 2002, pp. 419-437, XP002274532 cite dans la demande p. 420.

* cited by examiner

*Primary Examiner*—Kamal A Saeed
*Assistant Examiner*—Jason Nolan
(74) *Attorney, Agent, or Firm*—Young & Thompson

(57) ABSTRACT

A method of preparing an ionic conducting gel in solid form, known as ionogel. The method includes a step of mixing an ionic liquid with at least one molecular precursor containing at least one hydrolyzable group, if necessary in the presence of an acid, such as a carboxylic acid. The mixture is subsequently left to stand for one or more days until a gel is formed by polycondensation of the molecular precursor(s). The gel contains the aforementioned ionic liquid and can be set, in particular in transparent monolithic solid form.

20 Claims, No Drawings

IONIC CONDUCTING GELS, PREPARATION METHOD THEREOF AND USE OF SAME

A subject of the present invention is ion-conducting gels or ionogels, their preparation process as well as the uses of said ionogels.

The sol-gel process is well known in the prior art, simple to implement, takes place under mild conditions and facilitates the shaping of materials (Brinker and Scherer, 1990). In a standard fashion the sol-gel process consists of a hydrolysis and condensation process which, starting with a molecular precursor (true solution) leads to the formation of a colloidal solution (or sol) then, by connection of the colloidal particles, to the formation of a continuous solid skeleton named a gel. The non-hydrolytic sol-gel process is a particular case of a sol-gel process, taking place in the absence of water (Vioux, 1997). Another notable particular case consists of a sol-gel process for obtaining silica gels by using formic acid (formation of water in situ) (Sharp, 1994; Dai, 2000).

Ionic liquids are formed by the combination of cations and anions and are in the liquid state at temperatures close to ambient temperature. They have remarkable properties such as zero volatility, a high ionic conductivity as well as catalytic properties. They are currently used in numerous fields, in particular as electrolytes (Bonhôte et al., 1996; Olivier-Bourbigou et al., 2000; Branco et al., 2002; Doyl et al., 2000; Noda et al., 2000; Sun et al., 2001).

A purpose of the invention is to provide a monolithic solid in which an ionic liquid is confined in order to combine the physico-chemical properties of a mineral or organomineral solid with those of an ionic liquid.

A purpose of the invention is also to provide such a solid by sol-gel route, said solid thus obtained being stable at temperatures up to 300-350° C., transparent and an ion conductor.

A purpose of the invention is also to provide solid ion conductors, which are easy to shape, stable and effective up to temperatures at least of the order of 250° C.

A purpose of the invention is to provide an ion-conducting gel or ionogel the synthesis of which is carried out in a single stage which consists of mixing in homogeneous phase a solution, in ionic liquid medium, of one or more sol-gel precursors (alkoxysilane, alkylalkoxysilane, arylalkoxysilane, halogenosilane, halogenoalkoxysilane, metal alkoxide, metal alkylalkoxide or metal arylalkoxide, metal halide, etc.), alone, or in the presence of water, an aqueous solution (acid, basic, saline, etc.), a carboxylic acid, or another oxygen donor (alcohol, ether, etc.).

The present invention relates to a process for the preparation of an ion-conducting gel in solid form, also designated "ionogel", characterized in that it comprises a stage of mixing an ionic liquid with at least one molecular precursor comprising at least one hydrolyzable group, and if appropriate in the presence of an acid, such as a carboxylic acid, the mixture then being left to stand for one or more days until a gel is obtained, formed by polycondensation of the molecular precursor(s), containing within it the abovementioned ionic liquid, and capable of being shaped, in particular in the form of transparent monolithic solid.

The abovementioned process is characterized in that it comprises a single mixing stage.

The expression "ion-conducting gel" designates a continuous solid skeleton having the property of ionic conduction.

The expression "ionogel" designates a continuous solid skeleton containing an ionic liquid.

The expression "ionic liquid" designates the combination of cations and anions in the liquid state at temperatures close to ambient temperature.

The expression "molecular precursor" designates the reagent containing the base element or one of the base elements of which the gel is formed; the precursor has the preceding element or elements surrounded by ligands (appendages not containing the base element or elements). It is also called "sol-gel precursor".

The expression "hydrolyzable group" designates a chemical group bound to a molecular entity and being able to be separated from the latter by hydrolysis.

The expression "monolithic solid" designates a compound in the solid state at least one of the dimensions of which is at least of the order of a millimeter.

According to an advantageous embodiment of the present invention, the carboxylic acid used is in particular formic acid or acetic acid.

An advantageous process of the present invention is characterized in that the ionic liquid is chosen from those comprising as cation an imidazolium or pyridinium nucleus, if appropriate substituted, in particular by one or more alkyl groups with 1 to 4 carbon atoms.

According to an advantageous embodiment of the present invention, the process is characterized in that the cation of said ionic liquid is an imidazolium nucleus of the following formula (I):

in which:

$R_1$ and $R_2$ represent an alkyl group with 1 to 4 carbon atoms, and $Z_1$, $Z_2$ and $Z_3$ represent a hydrogen atom or an alkyl group with 1 to 4 carbon atoms.

The present invention also relates to a process as defined above, characterized in that the cation is:

1-butyl-3-methyliymidazolium of the following formula:

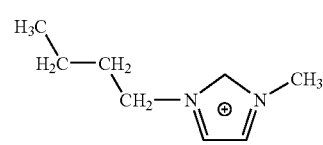

or 1-ethyl-3-methylimidazolium of the following formula:

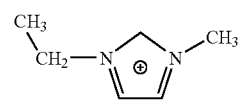

or 1-butyl-2,3,4,5-tetramethylimidazolium of the following formula:

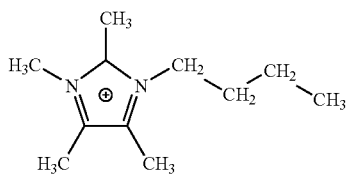

According to an advantageous embodiment of the present invention, the process is characterized in that the cation is a pyridinium nucleus of the following formula (II):

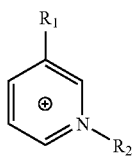

in which $R_1$ and $R_2$ represent a hydrogen atom or an alkyl group with 1 to 4 carbon atoms.

According to an advantageous embodiment of the present invention, the process is characterized in that the cation is 1-butyl-3-methylpyridinium of the following formula:

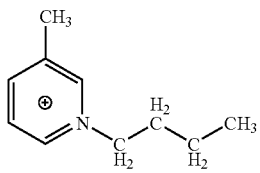

The present invention also relates to a process as defined above, characterized in that the ionic liquid contains, as anions, those chosen from the halides and perfluorinated anions.

The halide anions are in particular chosen from the following anions: chloride, bromide, fluoride or iodide.

The perfluorinated anions are in particular chosen from the following anions: $PF_6^-$, $BF_4^-$, $SO_3CF_3^-$ or $N(SO_2CF_3)_2^-$.

According to an advantageous embodiment of the present invention, the anion is:

bis(trifluoromethylsulphonyl)imide $N(SO_2CF_3)_2^-$ of structural formula:

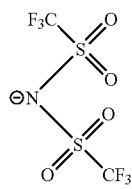

hexafluorophosphate of formula $PF_6^-$.

The present invention also relates to a process as defined above, characterized in that the ionic liquid is chosen from:
- 1-butyl-3-methylimidazolium bis(trifluoromethylsulphonyl)imide,
- 1-ethyl-3-methylimidazolium bis(trifluoromethylsulphonyl)imide,
- 1-butyl-3-methylimidazolium hexafluorophosphate.

The present invention also relates to a process as defined above, characterized in that the molecular precursor is chosen from the derivatives of the elements of groups 13, 14 and 15 of the periodic table, or transition metal derivatives.

The expression "derivatives of the elements of groups 13, 14 and 15 of the periodic table" designates chemical compounds comprising one or more elements of the boron (B), carbon (C) or nitrogen (N) columns of the classification of the elements in the Mendeleev's Table. These are for example $Al(C_2H_5)_3$, $Al(OCH(CH_3)_2)_3$ $Si(OCH_3)_4$, $SnCl_4$ or $PCl_5$.

The expression "transition metal derivatives" designates the compounds containing transition metals (groups 3 to 12) and various anions or ligands. These are for example $TiCl_4$, $Ti(OCH(CH_3)_2)_4$, $Ti(N(CH_3)_2)_4$ or $Zn(CH_3)_2$.

The present invention also relates to a process as defined above, characterized in that the molecular precursor is a compound of general formula $$R'_x(RO)_{4-x}Si$$

in which:
x is an integer varying from 0 to 4,
R represents an alkyl group with 1 to 4 carbon atoms, and
R' represents:
 an alkyl group comprising from 1 to 4 carbon atoms, or
 an aryl group comprising from 6 to 30 carbon atoms, or
 a halogen atom,
said compound being in particular tetramethoxysilane, methyltrimethoxysilane, phenyltriethoxysilane, or characterized in that the molecular precursor is a mixture of compounds as defined above.

Thus, the molecular precursor as used in the process of the invention is in particular an alkoxysilane when x=0. Such a case corresponds for example to tetramethoxysilane corresponding to the following formula: $Si(OCH_3)_4$ The molecular precursor as used in the process of the invention can in particular be an alkylalkoxysilane when x≠0 and R and R' represent an alkyl group. Such a case corresponds for example to methyltrimethoxysilane (x=1) corresponding to the following formula: $CH_3Si(OCH_3)_3$ Numerous other alkoxysilanes can be used, such as $(CH_3)_2Si(OCH_3)_2$ or $Si(OC_2H_5)_4$.

The molecular precursor as used in the process of the invention can in particular be an arylalkoxysilane when x≠0, R' represents an aryl group and R represents an alkyl group. Such a case corresponds for example to phenyltriethoxysilane (x=1) corresponding to the following formula: $C_6H_5Si(OCH_2CH_3)_3$ Moreover, the molecular precursor as used in the process of the invention can in particular be a halide when x=4 and R' represents a halogen atom. Such a case corresponds for example to $SiCl_4$.

According to an advantageous embodiment of the present invention, the process is characterized in that the ionic liquid/molecular precursor molar ratio in the mixture is 1/2.

The choice of this molecular ratio makes it possible to obtain a compound having good mechanical characteristics (non-friable, handleable).

According to an advantageous embodiment of the present invention, the process is characterized in that the carboxylic acid is formic acid.

The use of formic acid makes it possible to increase the speed of condensation.

According to an advantageous embodiment of the present invention, the process is characterized in that the molecular precursor/carboxylic acid molar ratio in the mixture is 1/50.

The choice of this molecular ratio makes it possible to increase the speed of condensation.

A preferred process according to the present invention is characterized in that the mixture is left to stand for 7 to 9 days under ambient atmosphere and temperature.

A preferred process according to the present invention is characterized in that the mixture is aged under ultrasound for 24 hours.

This preferred embodiment makes it possible to increase the speed of condensation thanks to ultrasound activation.

The present invention also relates to a process as defined above, characterized in that the ionogels obtained have the following characteristics:
they are monolithic solids,
they are stable up to temperatures of approximately 350° C.,
they are transparent,
they are ionic conductors, their ionic conductivity being in particular comprised between approximately $10^{-4}$ and $10^{-3}$ S.cm$^{-1}$ at ambient temperature and between $10^{-2}$ and $10^{-1}$ at 230° C.

The present invention also relates to ionogels as obtained by implementation of a process as defined above, said ionogels comprising an ionic liquid as defined above, confined within a continuous solid network formed from at least one molecular precursor as defined above.

The expression "continuous solid network" designates a solid skeleton extending throughout the material without interruption.

The expression "confined" means that the ionic liquid remains contained in the material, that it does not flow out of it and does not evaporate out of it.

The present invention also relates to ionogels as defined above, characterized in that they have the following characteristics:
they are monolithic solids,
they are stable up to temperatures of approximately 350° C.,
they are transparent,
they are ionic conductors, their ionic conductivity being in particular comprised between approximately $10^{-4}$ and $10^{-3}$ S.cm$^{-1}$ at ambient temperature and between $10^{-2}$ and $10^{-1}$ at 230° C.

The present invention also relates to ionogels as defined above characterized by the presence of an inorganic continuous solid network.

The preferred ionogels of the invention are characterized in that they have the following mechanical properties:
a Young's modulus comprised between approximately 50 and approximately 100 MPa, in particular comprised between approximately 52 and approximately 75 MPa, and preferably with an average value equal to approximately 63 MPa, and
a stress at break comprised between approximately 0.1 and approximately 1.5 MPa, in particular comprised between approximately 0.44 and approximately 1.31 MPa, and preferably with an average value equal to approximately 0.82 MPa.

The Young's modulus is the longitudinal modulus of elasticity and is equal to the stress to strain ratio.

The stress at break corresponds to the stress applied for the fracture, or break, of the test piece.

The present invention also relates to the ionogels as defined above, characterized in that they are stable in aqueous medium.

The present invention also relates to the use of ionogels as defined above:

as conducting materials, in particular within the framework of the preparation of accumulators, fuel cells, photovoltaic cells or electrochrome systems, in particular for display devices, as membranes for the implementation of separation processes for gases or liquids, or for electrodialysis, as stationary phase in chromatographic analysis.

The invention can find uses on the basis of its transparency as well as of its ionic conductivity. Uses based on its transparency can be envisaged for example by incorporation of coloured indicators, or for electrochrome systems, for example for display. Uses based on its ionic conductivity can be envisaged for example in batteries and cells, for example fuel cells which require ion-conducting membranes which perform well at temperatures of the order of 200° C. One of the advantages of the invention resides in the fact that the latter makes it possible to have solid ionic conductors which are easy to shape, stable and perform well up to temperatures at least of the order of 250° C. It should be noted that the polymer electrolytes currently used in cells, batteries and ion-exchange systems are stable up to temperatures of the order of 190° C. maximum; in fact, at higher temperatures, either degradation of the polymer membrane or evaporation of the liquid electrolyte is observed; the mineral electrolytes require operating temperatures above 600° C.

1. Synthesis of the Ionic Liquid 1-ethyl-3-methylimidazolium bis(trifluorosulphonyl)imide (EtMeIm$^+$NTf$_2^-$)

9.40 g of methylimidazole (0.115 mol) in 50 ml of ethyl acetate is introduced into a 500 ml three-necked flask equipped with a condenser. 14.25 g of ethyl bromide (0.126 mol) is added dropwise at ambient temperature. Then, the mixture is left for two hours under reflux before being extracted by three times 25 ml of ethyl acetate. The product is dried under vacuum at 70° C. for thirty minutes; this is ethylmethylimidazolium bromide.

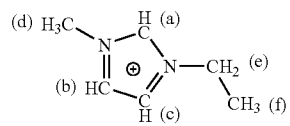

NMR $^1$H: (200 MHz, CD$_3$CN): δ 9.42 (t, 1H, Ha); 7.63 (d, 1H, Hb); 7.55 (d, 1H, Hc); 3.93 (s, 3H, Hd); 4.28 (q, 2H, He); 1.50 (t, 3H, Hf)

This product is added dropwise at ambient temperature to a mixture containing 50 ml of water and 31.37 g of lithium bis(trifluorosulphonyl)imide (0.109 mol). Then the mixture is stirred for two hours under reflux. The product is then extracted with three times 20 ml of dichloromethane before being evaporated under vacuum at 70° C. for 30 minutes. The overall yield is 86%.

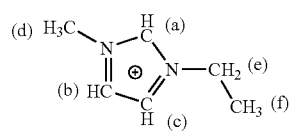

NMR $^1$H: (200 MHz, CD$_3$CN): δ 8.46 (s, 1H, Ha); 7.42 (s, 1H, Hb); 7.37 (s, 1H, Hc); 3.93 (s, 3H, Hd); 4.28 (q, 2H, He); 1.50 (t, 3H, Hf)

2. Synthesis of the Ionic Liquid 1-butyl-3-methylimidazolium bis(trifluorosulphonyl)imide (BuMeIm$^+$NTf$_2^-$)

The protocol is the same as for the synthesis of the ethyl methylimidazolium bis(trifluorosulphonyl)imide, replacing the ethyl bromide with butyl bromide, adhering to the proportions.

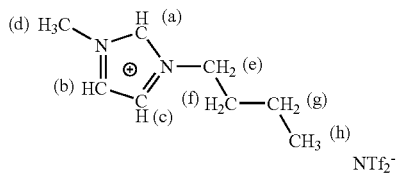

NMR $^1$H: (200 MHz, CD$_3$CN): δ 8.41 (s, 1H, Ha); 7.42 (s, 1H, Hb); 7.37 (s, 1H, Hc); 3.85 (s, 3H, Hd); 4.18 (q, 2H, He); 1.95 (t, 2H, Hf); 1.38 (q, 2H, Hg); 1.01 (t, 3H, Hh)

3. Synthesis of the Ionic Liquid 1-butyl-3-methylpyridinium bis(trifluorosulphonyl)imide (BuMePy$^+$NTf$_2^-$)

The precursor of this ionic liquid is 3-picoline which is introduced in a quantity of 1:1.1 with respect to butyl bromide. The experimental protocol is the same as that of protocol 1.

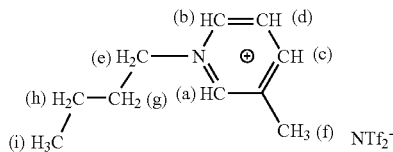

NMR $^1$H: (200 MHz, CD$_3$CN): δ 8.58 (s, 1H, Ha); 8.52 (d, 1H, Hb); 8.34 (d, 1H, Hc); 7.94 (t, 1H, Hd); 4.50 (t, 2H, He); 2.56 (s, 3H, Hf); 1.90 (s, 2H, Hg); 1.41 (s, 2H, Hh); 0.96 (t, 3H, Hi)

4. Ultrasound-Assisted Synthesis of the Ionic Liquid 1-butyl-3-methylimidazolium bis(trifluorosulphonyl)imide (BuMeIm$^+$NTf$_2^-$)

4.89 g of methylimidazole (0.059 mol) and 8.98 g of butyl bromide (0.065 mol) are introduced into a beaker. The beaker is placed under ultrasound, adjusted to have a pulsation of 2 seconds, with an instantaneous power of 15 W. The butylmethylimidazolium bromide is obtained with 100% yield.

This product is then added dropwise at ambient temperature to a mixture containing 50 ml of water and an equimolar quantity of lithium bis(trifluorosulphonyl)imide. The mixture is then maintained for two hours under reflux. The product is then extracted with three times 20 ml of dichloromethane before being evaporated under vacuum at 70° C. for 30 minutes. The overall yield is 94%.

5. Synthesis of Pellets Based on tetramethoxysilane, Containing the Ionic Liquid EtMeIm$^+$NTf$_2^-$ 1 ml of EtMeIm$^+$NTf$_2^-$ (3.6 mmol), 2 ml of formic acid (53 mmol) and 1 ml of tetramethoxysilane (6.8 mmol) are introduced in this order into a container, in particular a Teflon tube. The system, after homogenization, is left to gel at ambient pressure and temperature. Gelling takes place after approximately an hour and a half and ageing lasts 7 to 9 days. The pellet obtained is transparent.

6. Synthesis of Pellets Based on tetramethoxysilane, Containing the Ionic Liquid BuMeIm$^+$NTf$_2^-$ The process is the same as in protocol 5 maintaining the molar ratio 1/2 between ionic liquid and tetramethoxysilane.

7. Synthesis of Pellets Based on a tetramethoxysilane/methyltrimethoxysilane Mixture, Containing the Ionic Liquid EtMeIm$^+$NTf$_2^-$ x ml of tetramethoxysilane and y ml of methyltrimethoxysilane (with x+y=2 ml) are mixed in a beaker. Typically for a pellet having a molar ratio of 1 to 1 between the two coprecursors: x=y=1 ml. Then, 1 ml of EtMeIm$^+$NTf$_2^-$ (3.6 mmol), 2 ml of formic acid (53 mmol) and 1 ml of a mixture of precursors (6.8 mmol of Si equivalent) are introduced into a container, in particular a Teflon tube, in this order. The mixture is stirred. Then the system is left to gel at ambient pressure and temperature. The gelling takes place after approximately two hours and ageing lasts 7 to 9 days. The pellet obtained is transparent.

8. Synthesis of Pellets Based on a tetramethoxysilane/methyltrimethoxysilane Mixture, Containing the Ionic Liquid BuMeIm$^+$NTf$_2^-$ The process is the same as in protocol 7 maintaining the molar ratio 1/2 between ionic liquid and silylated precursors.

9. Synthesis of Pellets Based on a tetramethoxysilane/phenyltriethoxysilane Mixture, Containing the Ionic Liquid EtMeIm$^+$NTf$_2^-$ x ml of tetramethoxysilane and y ml of phenyltriethoxysilane (with x+y=2 ml) are mixed in a beaker. Typically for a pellet having a molar ratio of 1 to 0.6 between the two coprecursors: x=y=1 ml. Then, the process is the same as in protocol 7 maintaining the molar ratio 1/2 between ionic liquid and silylated precursor.

10. Synthesis of Pellets Based on a tetramethoxysilane/phenyltriethoxysilane Mixture, Containing the Ionic Liquid BuMeIm$^+$NTf$_2^-$ The process is the same as in protocol 9 maintaining the molar ratio 1/2 between ionic liquid and silylated precursors.

11. Ultrasound-Assisted Synthesis of Pellets Based on tetramethoxysilane, Containing the Ionic Liquid BuMeIm$^+$NTf$_2^-$ The protocol is the same as in protocol 6, but once the products are added the gelling takes place over an hour and a half under a hood and then the mixture is placed for 24 hours under ultrasound regulated to have a pulsation of 2 seconds and an instantaneous power of 15 W. The pellet obtained is transparent.

12. Synthesis of Test Pieces for Mechanical Bending Tests

Prior to the moulding of the test pieces, the mixture is made up as follows: 20 ml of BuMeIm$^+$NTf$_2^-$, 40 ml of formic acid and 20 ml of a mixture of coprecursors, as described in protocols 7 and 9. Then cylinders 6 mm in diameter and 65 mm in height are filled with 1.7 ml of this mixture. Gelling and ageing then take place over two weeks under a hood.

13. Measurements of Mechanical Bending Strength on Ionogels

The tests are three-point bending experiments on the test pieces described in protocol 10. The diameter to length ratio of the test pieces is 1/10. The speed of movement of the ram is 500 μm.min$^{-1}$. The cell used weighs 2 kg and the device is of Instrom make.

14. Conductivity Measurements

The monolithic pellets are used as they are. Study of mass samples with average dimensions: diameter 17-20 mm, thickness 4-5 mm.

The discoid pellets remain for 3 weeks in an atmosphere with 60% relative humidity.

A gold deposit is then produced by deposition on the two faces of the pellet, the edge is protected by a screen. Deposit condition: Argon gas, pressure 6 mbar (≈2,10$^{-1}$ atm) intensity 40 mA, time 15' on each face, Edwards S150A Sputter coater apparatus.

Complex impedance measurements are carried out using a frequency analyzer (Solartron 1174).

Two devices are used for the temperature study in:
a cell (Pelletier effect) allows study over the range −120 to +80° C.,
an oven extends the high-temperature part from ambient to +300° C.
Platinum pellets constitute the contacts.
In each case, the frequency range used is 10 to $10^6$ Hz.
An RKQ-type model (R and K in parallel with Q in series) is used in order to simulate the impedance spectra.
The conductivity is then expressed according to Arrhenius law.

15. Thermogravimetric Analyses/Measurements of Temperature Stability

The analyses are carried out on powdered pellets. The apparatus used is a Netzsch STA 409 thermobalance. The measurements are carried out under an air flow of 50 cm$^3$.min$^{-1}$, from 22° C. to 600° C. at a rate of 2° C.min$^{-1}$.

16. Stability of the Pellets in Aqueous Medium

The stability of the pellets is tested by introducing half-pellets into a 25 ml beaker filled with 15 ml of distilled water and closed by a film.

Results

Mechanical Tests

1) Case of the Ionogel Obtained from the Molecular Precursor tetramethoxysilane and the Ionic Liquid 1-butyl-3-methylimidazolium bis(trifluoromethylsulphonyl)imide

| Young's modulus | E = 63 ± 7 MPa |
| Stress at break | σ = 0.8 ± 0.2 MPa |

These values are of the order of those commonly obtained for the aerogels already described in the literature with a density of approximately 0.3. The aerogels described in the literature are gels which are dried under hypercritical conditions. These values therefore correspond to materials which are fragile, but non-friable and handleable.

2) Case of the Ionogels Obtained from the Mixtures of Silylated Precursors A (tetramethoxysilane/methyltrimethoxysilane 50/50 mol. %) and B (tetramethoxysilane/phenyltriethoxysilane 62/38 mol. %) and the Ionic Liquid 1-butyl-3-methylimidazolium bis(trifluoromethylsulphonyl) imide

|  | Mixture A | Mixture B |
|---|---|---|
| Young's modulus E (MPa) | 20 | 10 |
| Stress at break σ (MPa) | 0.6 | 0.3 |

Conductivities

1) Molecular precursor: tetramethoxysilane
Ionic liquid: 1-ethyl-3-methylimidazolium bis(trifluoromethylsulphonyl)imide

| conductivity (σ in S · cm$^{-1}$) | | | | |
|---|---|---|---|---|
| at −20° C. | at 0° C. | at 50° C. | at 150° C. | at 200° C. |
| 5.4 × 10$^{-5}$ | 1.5 × 10$^{-4}$ | 1.1 × 10$^{-3}$ | 6.6 × 10$^{-3}$ | 3.8 × 10$^{-2}$ |

2) Molecular precursor: tetramethoxysilane+methyltrimethoxysilane
Ionic liquid: 1-ethyl-3-methylimidazolium bis(trifluoromethylsulphonyl)imide

| conductivity (σ in S · cm$^{-1}$) | | | | |
|---|---|---|---|---|
| at −20° C. | at 0° C. | at 50° C. | at 150° C. | at 200° C. |
| 1.0 × 10$^{-5}$ | 4.0 × 10$^{-5}$ | 3.0 × 10$^{-4}$ | 1.8 × 10$^{-2}$ | 3.2 × 10$^{-2}$ |

3) Stability of Performance:

The ionogels were subjected to conductivity measurements at 200° C., repeated every 30 minutes for 16 hours: no degradation of the conductivity was noted.

These conductivity values classify ionogels among the best solid ionic conductors known to date, and particularly classify them as those having the best ionic conductivity/temperature resistance combination.

Stability in Aqueous Medium

1) Case of Ionogels Based on tetramethoxysilane

After a few hours the ionic liquid is extracted with water; therefore only the inorganic skeleton formed by the molecular precursor remains.

2) Case of the Ionogels Obtained by a tetramethoxysilane x/phenyltriethoxysilane y or tetramethoxysilane x/methyltrimethoxysilane y Mixture, with y<30 mol %

After two months the ionic liquid is displaced by water; therefore only the inorganic skeleton formed by the molecular precursor remains.

3) Case of the Ionogels Obtained by a tetramethoxysilane x/phenyltriethoxysilane y or tetramethoxysilane x/methyltrimethoxysilane y Mixture, with y>30 mol %

The stability in aqueous medium of these ionogels was tested over five months and it was noted that the pellet retained its integrity, the ionic liquid always being trapped inside the pores of the matrix.

REFERENCES

Branco et al. (2002) *Chem. Eur. J.,* 8(16), 3671-3677,
Brinker and Scherer (1990) Sol-Gel Science, Academic Press, San Diego,
Dai et al. (2000) *Chem. Commun.,* 243-244,
Doyl et al. (2000) *Journal of The Electrochemical Society,* 147(1), 34-37,
Noda et al. (2000) *Electrochimica Acta,* 45, 1265-1270,
Olivier-Bourbigou et al. (2000) *Journal of Molecular Catalysis,* A: Chemical, 182-183, 419-437,
Sharp (1994) *Journal of Sol-Gel Science and Technology,* 2, 35-41,
Sun et al. (2001) *Electrochimica Acta,* 46, 1703-1708,
Vioux (1997) *Chem. Mater.,* 9, 2292-2299.

The invention claimed is:

1. Ionogels as obtained by implementation of a process comprising a stage of mixing an ionic liquid with at least one molecular precursor of general formula:

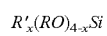

in which:
x is an integer varying from 0 to 4,
R represents an alkyl group with 1 to 4 carbon atoms, and
R' is selected from the group consisting of an alkyl group with 1 to 4 carbon atoms, an aryl group with 6 to 30 carbon atoms, and a halogen atom, and, optionally, in the presence of a carboxylic acid, the mixture then being left to stand for one or more days until a gel is obtained, formed by polycondensation of the molecular precursor(s), containing within it the ionic liquid, wherein, the ionogels are monolithic solids, the ionogels are stable up to temperatures of approximately 350° C., the ionogels transparent, and the ionogels are ionic conductors having an ionic conductivity of between approximately $10^{-4}$ and $10^{-3}$ S.cm$^{-1}$ at ambient temperature and between $10^{-2}$ and $10^{-1}$ at 230° C.

2. The ionogels according to claim 1, comprising a continuous solid network.

3. The ionogels according to claim 1, wherein the ionogels have the following mechanical properties:

a Young's modulus between approximately 50 and approximately 100 MPa, and a stress at break between approximately 0.1 and approximately 1.5 Mpa.

4. The ionogels according to claim 1, wherein the ionogels are stable in aqueous medium.

5. The ionogels according to claim 1, wherein the ionic liquid is a liquid comprising an imidazolium or pyridinium nucleus as a cation, optionally substituted by one or more alkyl groups with 1 to 4 carbon atoms.

6. The ionogels according to claim 5, wherein the cation is an imidazolium nucleus of the following formula (I):

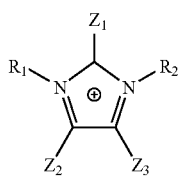

in which:

$R_1$ and $R_2$ represent an alkyl group with 1 to 4 carbon atoms, and $Z_1$, $Z_2$ and $Z_3$ represent a hydrogen atom or an alkyl group with 1 to 4 carbon atoms.

7. The ionogels according to claim 5, wherein the cation is selected from the group consisting of:

1-butyl-3-methylimidazolium of the following formula:

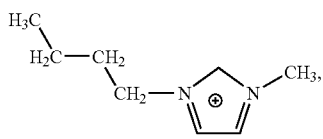

1-ethyl-3-methylimidazolium of the following formula:

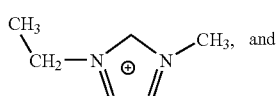

1-butyl-2, 3, 4, 5-tetramethylimidazolium of the following formula:

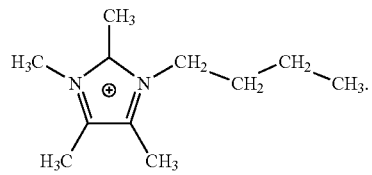

8. The ionogels according to claim 5, wherein the cation is a pyridinium nucleus of the following formula (II)

in which $R_1$ and $R_2$ represent a hydrogen atom or an alkyl group with 1 to 4 carbon atoms.

9. The ionogels according to claim 5, wherein the cation is 1-butyl-3-methylpyridinium of the following formula:

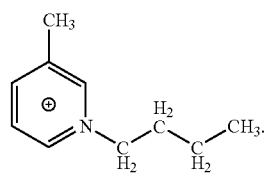

10. The ionogels according to claim 1, wherein the ionic liquid contains anions selected from the group consisting of halides and perfluorinated anions.

11. The ionogels according to claim 10, wherein the anion is:

bis(trifluoromethylsulphonyl)imide of formula:

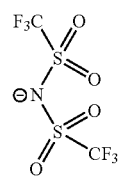

hexafluorophosphate of formula $PF_6^-$.

12. The ionogels according to claim 5, wherein the ionic liquid is selected from the group consisting of:

1-butyl-3-methylimidazolium bis (trifluoromethylsulphonyl) imide, 1-ethyl-3-methylimidazolium is (trifluoromethylsulphonyl) imide, and 1-butyl-3-methylimidazolium hexafluorophosphate.

13. The ionogels according to claim 1, wherein the molecular precursor is selected from the group consisting of tetramethoxysilane, methyltrimethoxysilane, phenyltriethoxysilane, and mixture thereof.

14. The ionogels according to claim 1, wherein the ionic liquid/molecular precursor molar ratio in the mixture is 1/2.

15. The ionogels according to claim 1, wherein the carboxylic acid is formic acid.

16. The ionogels according to claim 1, wherein the molecular precursor/carboxylic acid molar ratio in the mixture is 1/50.

17. The ionogels according to claim 1, wherein the mixture is left to stand for 7 to 9 days under ambient atmosphere and temperature.

18. The ionogels according to claim 1, wherein the mixture is aged under ultrasound for 24 hours.

19. The ionogels according to claim 3, wherein the Young's modulus is between approximately 52 and approximately 75 MPa, and the stress at break is between approximately 0.44 and approximately 1.31 MPa.

20. The ionogels according to claim 19, wherein the Young's modulus has an average value equal to approximately 63 MPa, and a stress at break has an average value equal to approximately 0.82 MPa.

* * * * *

UNITED STATES PATENT AND TRADEMARK OFFICE
CERTIFICATE OF CORRECTION

PATENT NO. : 7,622,422 B2
APPLICATION NO. : 10/562680
DATED : November 24, 2009
INVENTOR(S) : Vioux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this

Fourteenth Day of December, 2010

David J. Kappos
*Director of the United States Patent and Trademark Office*